US008581702B2

(12) United States Patent  (10) Patent No.: US 8,581,702 B2
Nguyen  (45) Date of Patent: Nov. 12, 2013

(54) INFORMATION MANAGEMENT USING A CUSTOM IDENTIFIER STORED ON AN IDENTIFICATION TAG

(75) Inventor: Chung T. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 12/947,050

(22) Filed: Nov. 16, 2010

(65) Prior Publication Data

US 2012/0119881 A1 May 17, 2012

(51) Int. Cl.
*H04Q 5/22* (2006.01)

(52) U.S. Cl.
USPC ..... 340/10.1; 340/10.2; 340/10.4; 340/572.1; 340/572.4; 235/375; 235/376; 235/385; 705/30

(58) Field of Classification Search
None
See application file for complete search history.

(56) References Cited

U.S. PATENT DOCUMENTS

| | | | |
|---|---|---|---|
| 7,239,240 | B1 | 7/2007 | How |
| 7,649,460 | B2 | 1/2010 | Rodgers |
| 2002/0140714 | A1* | 10/2002 | Hoffman ........................ 345/700 |
| 2002/0161848 | A1* | 10/2002 | Willman et al. ............... 709/213 |
| 2005/0061875 | A1 | 3/2005 | Zai et al. |
| 2006/0017545 | A1 | 1/2006 | Volpi et al. |
| 2006/0235805 | A1 | 10/2006 | Peng et al. |
| 2007/0103272 | A1 | 5/2007 | Alden |
| 2008/0001752 | A1* | 1/2008 | Bruns et al. ................. 340/572.1 |
| 2008/0150702 | A1 | 6/2008 | Neill et al. |
| 2008/0169903 | A1 | 7/2008 | Fein et al. |
| 2008/0209543 | A1 | 8/2008 | Aaron |
| 2009/0115573 | A1* | 5/2009 | Naressi et al. ................ 340/10.1 |
| 2009/0231127 | A1 | 9/2009 | Angell et al. |
| 2009/0283589 | A1 | 11/2009 | Moore et al. |

FOREIGN PATENT DOCUMENTS

CN  101514534 A  8/2009

OTHER PUBLICATIONS

Cai Hong-Bin et al., "A Handwritten Signature Verification Method Based on Wavelet Transform to Pick Up Inflection Points", Journal of Image and Graphics, Mar. 2003, http://en.cnki.com.cn/Article_en/CJFDTOTAL-ZGTB200303004.htm, 4 pages.
Wei Jiang et al., "A Compression Framework for Personal Image Used in Mobile RFID System", The 9th International Conference for Young Computer Scientists, 2008, pp. 769-774.
Jin Whan Kim et al., "A Study on Enhanced Dynamic Signature Verification for the Embedded System", Lecture Notes in Computer Science, 2005, vol. 3704, Brain, Vision, and Artificial Intelligence, pp. 436-446.

(Continued)

*Primary Examiner* — Tai T Nguyen
*Assistant Examiner* — Ojiako Nwugo
(74) *Attorney, Agent, or Firm* — Matthew Chung; Hoffman Warnick LLC (57) ABSTRACT

A solution for managing information using an identification tag is provided. For example, information relating to an item and/or one or more transfers of the item can be managed using an identification tag associated with the item. The identification tag can store and transmit an item identifier, such as an electronic product code (EPC), corresponding to the item, which can be obtained and stored in a data store. Access information for retrieving the item identifier and identification information for a party to the transfer can be used to generate a custom identifier that can be provided for storage on the identification tag in place of the item identifier. The custom identifier can subsequently be used to acquire information on the item and/or the transfer event.

20 Claims, 5 Drawing Sheets

(56) References Cited

OTHER PUBLICATIONS

Garfinkel et al., "RFID Privacy: An Overview of Problems and Proposed Solutions", IEEE Security and Privacy, vol. 3, Issue 3, 2005, pp. 34-43.

Declan McCullagh, "Perspective: RFID tags: Big Brother in small packages", http://news.cnet.com/2010-1069-980325.html, Jan. 13, 2003, 3 pages.

EPIC—Electronic Privacy Information Center, "Radio Frequency Identification (RFID) Systems", http://epic.org/privacy/rfid, Printed Out Oct. 28, 2010, 15 pages.

* cited by examiner

FIG. 3B

INFORMATION MANAGEMENT USING A CUSTOM IDENTIFIER STORED ON AN IDENTIFICATION TAG

TECHNICAL FIELD

The disclosure relates generally to identification tags, and more particularly, to protecting personal information using modified identification information stored on an identification tag.

BACKGROUND ART

Radio frequency identification (RFID) technology continues to provide many advantages and benefits to both consumers and businesses in areas such as tracking goods, inventory, and logistic applications. For example, some industrial and commercial applications employ RFID technology to associate customer profiles with their product preferences. In an illustrative application, an RFID tag writer can write information to an RFID tag associated with an item when the item is purchased by an individual. The information can include information that uniquely identifies the individual in a database managed by the seller. Subsequently, should the individual return to the seller with the item, an RFID tag reader can acquire the identification information for the item and the individual and quickly provide an associate with information regarding the purchase.

However, information embedded on an RFID tag also can be acquired by an unauthorized and/or unintended RFID reader and/or tracking system, e.g., as an individual moves from one location to another while carrying an item including the RFID tag. In this case, the data can provide a third party with unauthorized information about a particular individual, e.g., a group of items being worn/carried by the individual.

SUMMARY OF THE INVENTION

Aspects of the invention provide a solution for managing information using an identification tag. For example, information relating to an item and/or one or more transfers of the item can be managed using an identification tag associated with the item. The identification tag can store and transmit an item identifier, such as an electronic product code (EPC), corresponding to the item, which can be obtained and stored in a data store. Access information for retrieving the item identifier and identification information for a party to the transfer can be used to generate a custom identifier, which can be provided for storage on the identification tag in place of the item identifier. The custom identifier subsequently can be used to acquire information on the item and/or the transfer event.

A first aspect of the invention provides a computer-implemented method of managing information using an identification tag, the method comprising: managing a first event for an item using a computer system, wherein the identification tag is associated with the item and wherein the first event transfers possession of the item to a transferee, the managing including: obtaining an item identifier stored on the identification tag, wherein the item identifier corresponds to an identification of the item; storing the item identifier in a data store, wherein the item identifier can be retrieved from the data store using access information uniquely identifying a storage location for the item identifier in the data store; obtaining first event identification information for the transferee, wherein the first event identification information uniquely identifies the transferee; generating a custom identifier based on a combination of at least a portion of the first event identification information for the transferee of the item and at least a portion of the access information for the item identifier; and providing the custom identifier for storage on the identification tag in place of the item identifier.

A second aspect of the invention provides a computer system comprising: a set of computing devices for managing information using an identification tag by performing a method comprising: managing a first event for an item, wherein the identification tag is associated with the item and wherein the first event transfers possession of the item to a transferee, the managing including: obtaining an item identifier stored on the identification tag, wherein the item identifier corresponds to an identification of the item; storing the item identifier in a data store, wherein the item identifier can be retrieved from the data store using access information uniquely identifying a storage location for the item identifier in the data store; obtaining first event identification information for the transferee, wherein the first event identification information uniquely identifies the transferee; generating a custom identifier based on a combination of at least a portion of the first event identification information for the transferee of the item and at least a portion of the access information for the item identifier; and providing the custom identifier for storage on the identification tag in place of the item identifier.

A third aspect of the invention provides a computer program comprising program code embodied in at least one computer-readable medium, which when executed, enables a computer system to implement a method of managing information using an identification tag, the method comprising: managing a first event for an item, wherein the identification tag is associated with the item and wherein the first event transfers possession of the item to a transferee, the managing including: obtaining an item identifier stored on the identification tag, wherein the item identifier corresponds to an identification of the item; storing the item identifier in a data store, wherein the item identifier can be retrieved from the data store using access information uniquely identifying a storage location for the item identifier in the data store; obtaining first event identification information for the transferee, wherein the first event identification information uniquely identifies the transferee; generating a custom identifier based on a combination of at least a portion of the first event identification information for the transferee of the item and at least a portion of the access information for the item identifier; and providing the custom identifier for storage on the identification tag in place of the item identifier.

A fourth aspect of the invention provides a method of generating a computer system for managing information using an identification tag, the method comprising: providing a computer system operable to: manage a first event for an item, wherein the identification tag is associated with the item and wherein the first event transfers possession of the item to a transferee, the managing including: obtaining an item identifier stored on the identification tag, wherein the item identifier corresponds to an identification of the item; storing the item identifier in a data store, wherein the item identifier can be retrieved from the data store using access information uniquely identifying a storage location for the item identifier in the data store; obtaining first event identification information for the transferee, wherein the first event identification information uniquely identifies the transferee; generating a custom identifier based on a combination of at least a portion of the first event identification information for the transferee of the item and at least a portion of the access information for the item identifier; and providing the custom identifier for storage on the identification tag in place of the item identifier.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for managing information using an identification tag. For example, information relating to an item and/or one or more transfers of the item can be managed using an identification tag associated with the item. The identification tag can store and transmit an item identifier, such as an electronic product code (EPC), corresponding to the item, which can be obtained and stored in a data store. Access information for retrieving the item identifier and identification information for a party to the transfer can be used to generate a custom identifier, which can be provided for storage on the identification tag in place of the item identifier. The custom identifier subsequently can be used to acquire information on the item and/or the transfer event. As used herein, unless otherwise noted, the term "set" means one or more (i.e., at least one) and the phrase "any solution" means any now known or later developed solution.

Figure 1:
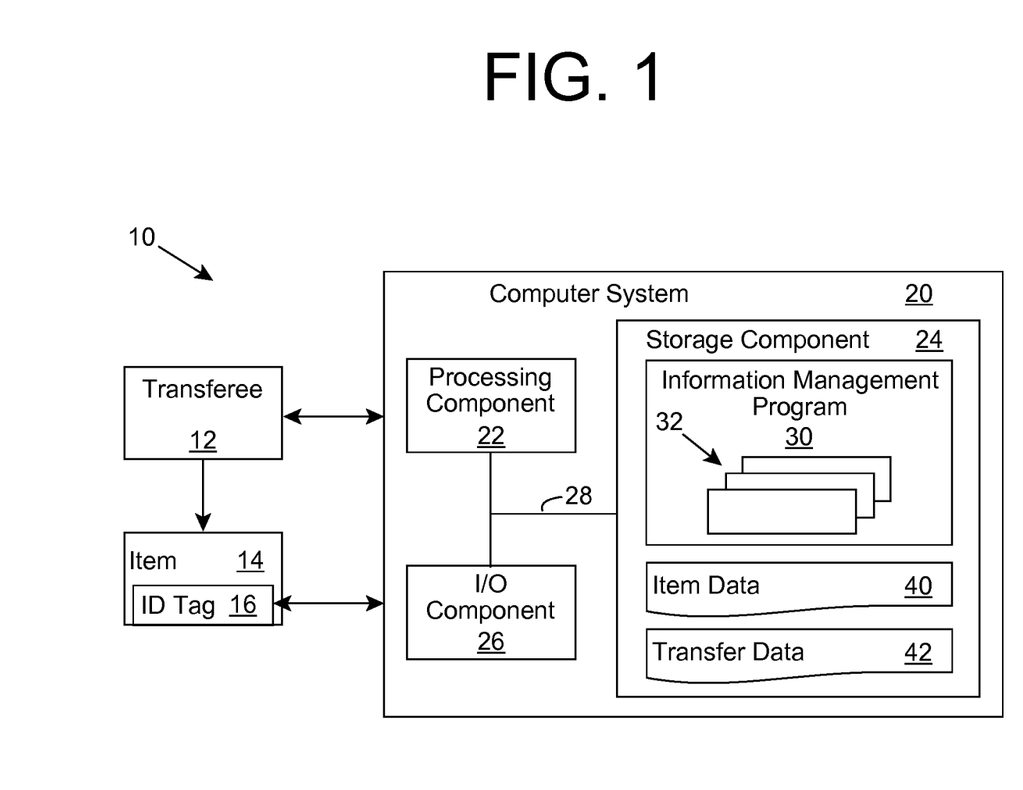
FIG. 1 shows an illustrative environment for managing information using an identification tag according to an embodiment.

Turning to the drawings, FIG. 1 shows an illustrative environment 10 for managing information using an identification tag 16 according to an embodiment. To this extent, environment 10 includes a computer system 20 that can perform a process described herein in order to manage information using the identification tag 16. In particular, computer system 20 is shown including an information management program 30, which makes computer system 20 operable to manage information using the identification tag 16 by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as information management program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user, such as transferee 12, to interact with computer system 20 and/or one or more communications devices to enable a system user (e.g., another computer system used to interact with transferee 12 and/or identification tag 16) to communicate with computer system 20 using any type of communications link. To this extent, information management program 30 can manage a set of interfaces (e.g., graphical user interface(s), application program interface, and/or the like) that enable human and/or system users to interact with information management program 30. Further, information management program 30 can manage (e.g., store, retrieve, create, manipulate, organize, present, etc.) the data, such as item data 40 and transfer data 42, using any solution.

In any event, computer system 20 can comprise one or more general purpose computing articles of manufacture (e.g., computing devices) capable of executing program code, such as information management program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, information management program 30 can be embodied as any combination of system software and/or application software.

Further, information management program 30 can be implemented using a set of modules 32. In this case, a module 32 can enable computer system 20 to perform a set of tasks used by information management program 30, and can be separately developed and/or implemented apart from other portions of information management program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of information management program 30 fixed thereon (e.g., one or more modules 32). However, it is understood that computer system 20 and information management program 30 are only representative of various possible equivalent computer systems that may perform a process described herein. To this extent, in other embodiments, the functionality provided by computer system 20 and information management program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, information management program 30 enables computer system 20 to manage information using an identification tag 16. To this extent, computer system 20 can acquire and/or utilize the information during a transfer event for an item 14. The transfer event can comprise any type of event that transfers possession of the item 14 from a first party (e.g., a store) to a second party (e.g., transferee 12). Illustrative transfer events include a sale of the item 14, a lease/rental of the item 14, a return of the item 14, servicing/repair of the item 14, and/or the like. To this extent, possession of the item 14 can be temporarily or permanently transferred as a result of the transfer event.

During the transfer event, computer system 20 can acquire and/or utilize item data 40 corresponding to the item 14. The item data 40 can comprise various information regarding the item 14, such as the item type, a description of the item 14, item model number, item serial number, an electronic product code (EPC) of the item 14, and/or the like. When computer system 20 is managed by a store, the item data 40 can further include information regarding when the item 14 was received, a cost of the item 14, data on the transfer event(s) for the item 14, and/or the like.

Computer system 20 also can acquire and/or utilize transfer data 42 during the transfer event. The transfer data 42 can include various information regarding the transfer event, one or both parties involved in the transfer event, and/or the like. For example, the transfer data 42 can comprise information corresponding to a transferee 12 (e.g., a purchaser), such as his/her name, payment information, and/or the like. Additionally, the transfer data 42 can include data that uniquely identifies the transferee 12, such as a signature, a hand/finger print, a voice print, a captured image, and/or the like. Similarly, the transfer data 42 can comprise information corresponding to a transferor, such as his/her name, identification information, store location, and/or the like. When either of the individuals involved in the transfer event are part of a larger group of related individuals (e.g., a family, a business entity, etc.), the transfer data 42 also can include information regarding the group of related individuals to which the individual belongs.

The item 14 can comprise an identification tag 16 associated therewith, which computer system 20 can utilize to store and/or retrieve item data 40 and/or transfer data 42. The identification tag 16 can be attached to a component of the item 14 and/or item packaging, and can be configured to store and transmit information corresponding to the item 14. The identification tag 16 can comprise a rewritable storage medium, which can store data associated with the item 14, the transfer event, the transferee 12, and/or the like. During a transfer event, computer system 20 can obtain data stored on the identification tag 16 and/or provide data for storage on the identification tag 16 using any solution. In an embodiment, data can be read from/written to the identification tag 16 using a wireless communications solution. In an illustrative embodiment, the identification tag 16 comprises a rewritable radio frequency identification (RFID) tag 16, which can interface with computer system 20 via one or more I/O components 26, such as an RFID tag reader and/or writer, included therein.

Computer system 20 can be managed by one of the parties involved in the transfer event. For example, computer system 20 can be managed by a business entity having one or more associated stores, each of which offers various items 14 for sale and/or lease. Alternatively, computer system 20 can be managed by a third party, which is not directly involved in the transfer event. For example, computer system 20 can be managed by a manufacturer of the item 14. In this case, when the item 14 is transferred by a third party, the transferor (e.g., a store) can acquire and/or provide item data 40 and/or transfer data 42 from and/or to the computer system 20 using any communications solution.

Additional aspects of the invention are described herein with reference to managing a pair of events corresponding to an item 14 using computer system 20. As a result of the first event (e.g., the transfer event), possession of the item 14 is transferred from a first party to a transferee 12. The second event (e.g., the return event) occurs when the item 14 is returned to the first party (e.g., as a merchandise return, for servicing, and/or the like). It is understood that while these two types of events are shown and described herein as illustrative events, aspects of the invention can be utilized as part of any type of event for an item 14.

Figure 2A:
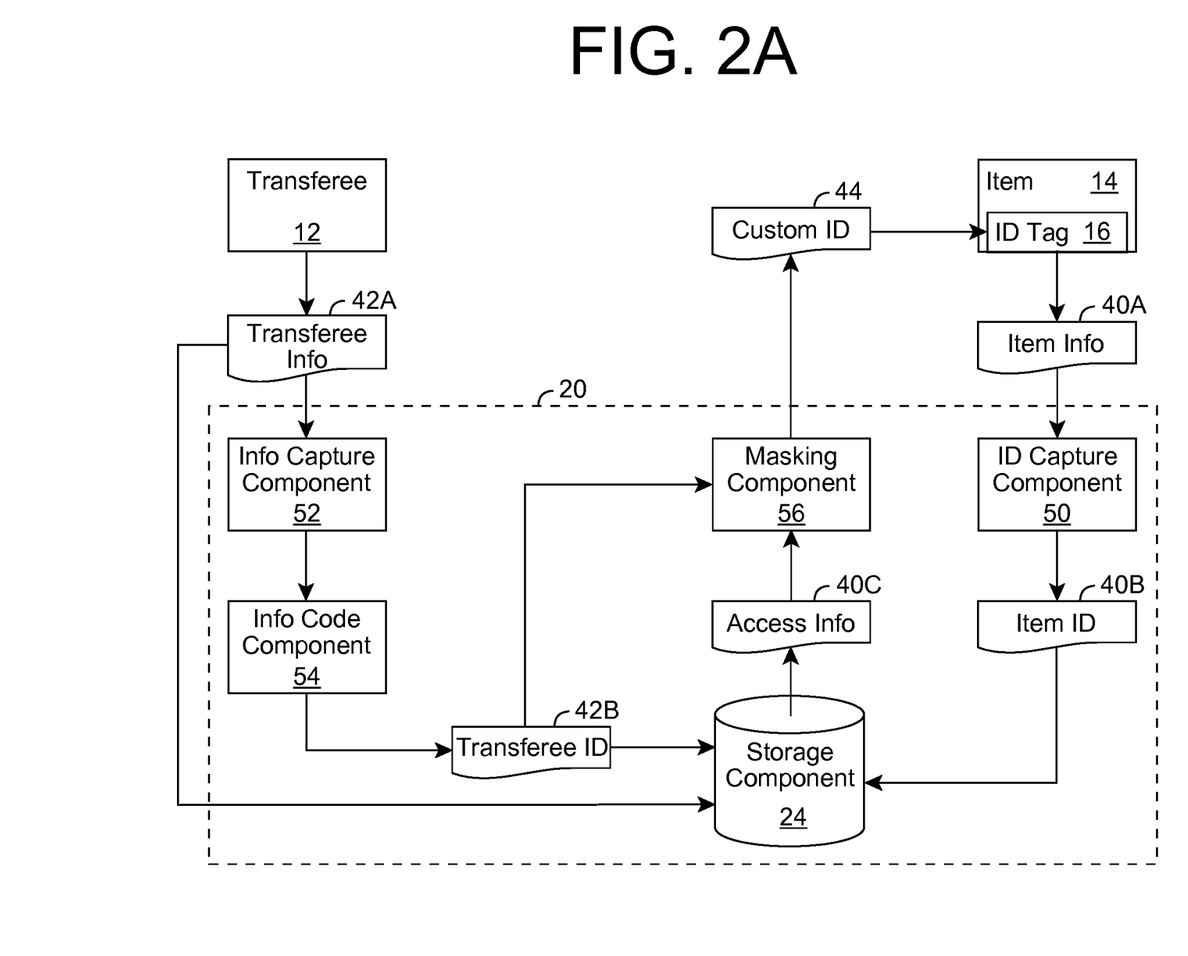
FIGS. 2A and 2B show illustrative data flow and process flow diagrams, respectively, for a transfer event according to an embodiment.
Figure 2B:
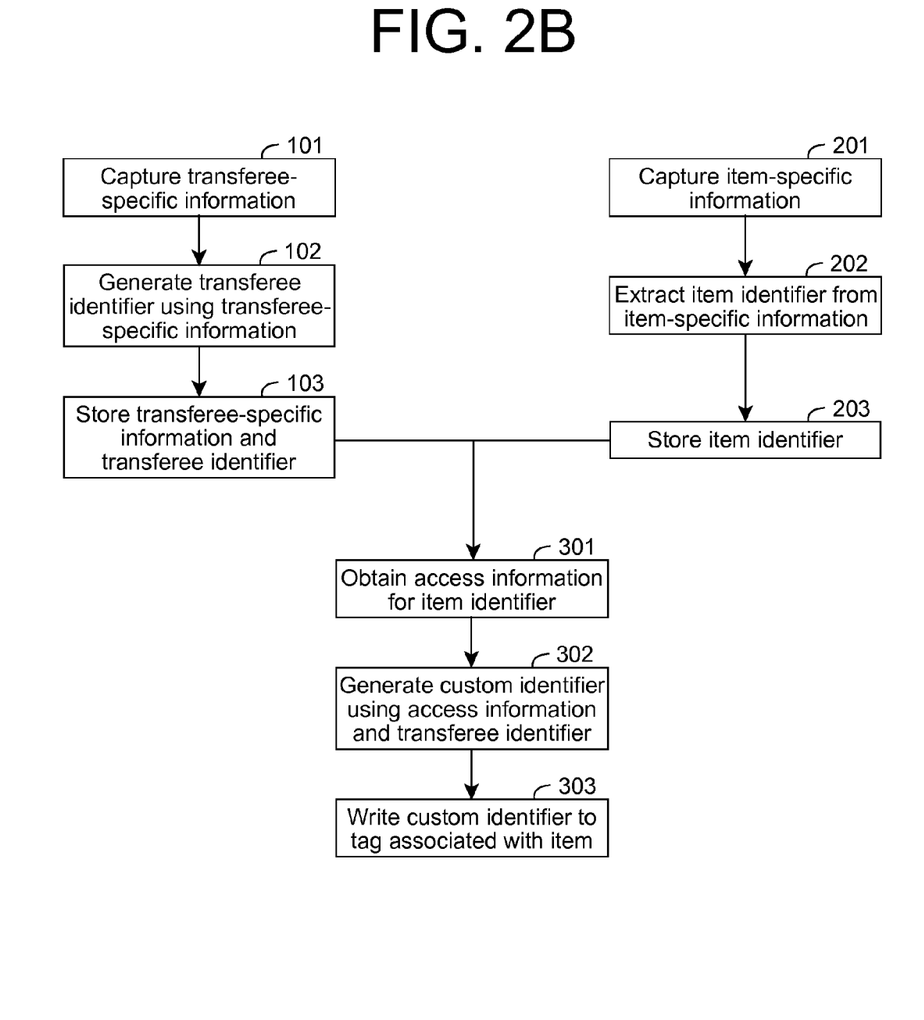

FIGS. 2A and 2B show illustrative data flow and process flow diagrams, respectively, for a transfer event, which can be managed by computer system 20, according to an embodiment. Referring to FIGS. 2A and 2B, in process 101, computer system 20 (e.g., an information capture component 52 implemented as part of computer system 20) can capture transferee-specific information 42A using any solution. The transferee information 42A can include various information regarding the individual to which the item 14 is being transferred. Such information can include data regarding the payment method utilized, contact information, information on a group to which the individual belongs (e.g., family, organization, business entity, etc.), and/or the like.

Additionally, the transferee information 42A acquired by computer system 20 (e.g., information capture component 52) can include information capable of personally distinguishing the individual from all other individuals with an acceptable degree of certainty. In an embodiment, the computer system 20 acquires two-dimensional data corresponding to the transferee 12. For example, the two-dimensional data can comprise a digitized voice signature (e.g., recorded when the transferee 12 speaks a particular word/phrase), a digital image of the transferee 12, a digital hand/finger scan, and/or the like. In an illustrative embodiment, the two-dimensional data comprises a signature of the transferee 12, which computer system 20 can acquire using, for example, an electronic signature capture device. Furthermore, the transferee information 42A acquired by computer system 20 can include uniquely identifying information provided by a government agency (e.g., a state driver's license number, and/or the like).

In any event, in process 102, computer system 20 (e.g., an information code component 54 implemented as part of computer system 20) can generate transfer event identification information for the transferee 12 using some or all of the transferee information 42A. In an embodiment, the transfer event identification information comprises a numeric transferee identifier 42B, which can uniquely identify the transferee 12 from all other individuals with an acceptable degree of certainty. The number of bits utilized in the transferee identifier 42B can be selected based on the acceptable degree of certainty, the resolution of the two-dimensional data acquired for the transferee 12, an amount of storage space allocated for the transferee identifier 42B, and/or the like. In an illustrative embodiment, the transferee identifier 42B comprises at least a twenty-four bit number.

Computer system 20 (e.g., information code component 54) can generate the transferee identifier 42B using any solution. For example, when the transferee information 42A comprises two-dimensional data, such as a digital image of a handwritten signature of the transferee 12, computer system 20 can perform any of various types of image/signal processing and analysis to generate the transferee identifier 42B. In an embodiment, computer system 20 extracts a set of integers from the two-dimensional data, and generates the transferee identifier 42B using some or all of the extracted integer(s). For example, computer system 20 can perform one or more transforms, such as a discrete wavelet transform, Fourier transform, and/or the like, to extract the integer(s). In an illustrative embodiment, computer system 20 utilizes a discrete wavelet transform to decompose the two-dimensional data into a series of wavelet coefficients (e.g., integers), and generates the transferee identifier 42B using some or all of the wavelet coefficients to represent the unique features of the two-dimensional data. For example, computer system 20 can merge/format the wavelet coefficients into a desired format for the transferee identifier 42B.

In any event, in process 103, computer system 20 can store some or all of the transferee information 42A and the transferee identifier 42B in a storage component 24. Computer system 20 can use any solution for storing and managing the data 42A, 42B in the storage component 24. For example, the transferee information 42A and transferee identifier 42B can be stored as one or more records in a relational database. When data corresponding to the transferee 12 is present in storage component 24 prior to the transfer event, computer system 20 can update, supplement, reference, and/or the like, the previously stored data with the data acquired during the transfer event using any solution.

During the transfer event, computer system 20 also can obtain item data 40 corresponding to the item 14 being transferred. To this extent, in process 201, computer system 20 (e.g., an identifier capture component 50 implemented as part of computer system 20) can capture item information 40A using any solution. For example, the item 14 can include an associated identification tag 16 (e.g., an RFID tag), which stores and transmits the item information 40A. Computer system 20 can receive the transmitted item information 40A from the identification tag 16. Subsequently, in process 202, computer system 20 can extract an item identifier 40B, such as an electronic product code (EPC), using the item information 40A. In an embodiment, the item information 40A is the item identifier 40B. Alternatively, computer system 20 can extract the item identifier 40B from a subset of the data included in the item information 40A.

Additionally, the item information 40A can include other information corresponding to the item 14, such as a model/serial number, a date the item 14 arrived at a store, one or more attributes of the item 14 (e.g., color), and/or the like. Computer system 20 also can obtain item data 40 corresponding to item 14 using one or more additional solutions. For example, computer system 20 can scan a bar code included on the packaging for the item 14, acquire image data of the item 14, and/or the like. Furthermore, computer system 20 can acquire additional information corresponding to the item 14 from another source, such as a data store (e.g., storage component 24), using some or all of the item information 40A. Computer system 20 can utilize some or all of the item data 40 for inventory tracking/projecting, product evaluation, and/or the like. In any event, in process 203, computer system 20 can store and manage the item identifier 40B, item information 40A, and/or additional item data 40 in the storage component 24 using any solution (e.g., one or more records in a database).

The item identifier 40B and/or other item data 40 can be linked to some or all of the transfer data 42. For example, computer system 20 can store the transferee identifier 42B, item identifier 40B, and/or additional data in a set of records, or the like. In any event, as part of the transfer event, computer system 20 can overwrite some or all of the item information 40A stored on the identification tag 16. In process 301, computer system 20 (e.g., a masking component 56 implemented as part of computer system 20) can obtain access information 40C for the stored item identifier 40B. The access information 40C can comprise any type of information that can enable computer system 20 to retrieve the item identifier 40B from storage component 24 without additional data. In an embodiment, the access information 40C comprises a numeric value, which computer system 20 can utilize to retrieve the item identifier 40B from the storage component 24. In a more specific illustrative embodiment, the access information 40C comprises a unique numeric identifier (e.g., an index), which is distinct from the item identifier 40B and the transferee identifier 42B, and which specifically identifies a record containing the item identifier 40B that is stored in a table of a database.

In process 302, computer system 20 (e.g., masking component 56) can generate a custom identifier 44 using the access information 40C and the transfer event identification information for the transferee 12 (e.g., transferee identifier 42B). In an illustrative embodiment, computer system 20 sets a first set of bits for the custom identifier 44 according to at least a portion of the transfer event identification information for the transferee 12 (e.g., transferee identifier 42B) and sets a second set of bits for the custom identifier 44 according to at least a portion of the access information 40C for the item identifier 40B. In a more specific illustrative embodiment, the custom identifier 44 can comprise a thirty-two bit number, in which twenty-four bits are allocated to the transferee identifier 42B and eight bits are allocated to the access information 40C. In this case, the first and second sets of bits can be allocated within the thirty-two bit number using any solution, including separate, adjacent groups of bits, intermingled bits, and/or the like. However, it is understood that this is only illustrative, and custom identifier 44 can comprise any number of bits, which can be allocated between access information 40C, transferee identifier 42B, and/or additional information using any solution. Illustrative additional information that can be included with custom identifier 44 can include information indicating the type of the custom identifier 44, the system that generated the custom identifier 44, and/or the like. When computer system 20 utilizes only a portion of the access information 40C and/or transferee identifier 42B in the custom identifier 44, computer system 20 can select the least significant bits of the corresponding identifier for use in the custom identifier 44.

In process 303, computer system 20 (e.g., masking component 56) can provide the custom identifier 44 for storage on the identification tag 16 in place of at least a portion of the item information 40A using any solution. For example, when identification tag 16 comprises an RFID tag, computer system 20 can include an RFID tag writer, which transmits a write command including the custom identifier 44 for processing by the identification tag 16. Regardless, it is understood that any type of communications solution can be utilized based on the particular type of identification tag 16 associated with the item 14. In an embodiment, computer system 20 provides the custom identifier 44 for storage on the identification tag 16 in place of the item identifier 40B (e.g., the original EPC of the item 14). Additionally, computer system 20 can overwrite/erase additional item information 40A, which may be stored on the identification tag 16, e.g., while the item 14 is in stock, or the like.

After completing the transfer event, the transferee 12 can possess the item 14 with the associated identification tag 16. As the transferee 12 moves the item 14 from location to location, other identification tag readers operated by third parties may interrogate the identification tag 16 for the item information 40A stored thereon. In response, the identification tag 16 can transmit the custom identifier 44. However, contrary to the item identifier 40B and/or personal information of the transferee 12, the custom identifier 44 and other item information 40A, if present, will not provide the third party with any information associated with the item 14 and/or the transferee 12. In particular, only a computer system 20 having access to storage component 24 and knowledge of how the custom identifier 44 was generated can obtain information regarding the item 14 and/or the transferee 12 using the custom identifier 44. As a result, personal information of the transferee 12 is safeguarded from access by unauthorized third parties.

Computer system 20 can automatically perform the process shown and described herein as part of a normal checkout process performed during a transfer event (e.g., purchase, lease, and/or the like) of the item 14 to the transferee 12. Alternatively, computer system 20 can enable the transferee 12 to select one of various options for the checkout process, one of which includes the process described herein. For example, computer system 20 can enable the transferee 12 to select to leave the item information 40A on the identification tag 16 alone; mask some or all of the item information 40A as described herein; remove/erase all item information 40A from the identification tag 16; remove or make inoperable the identification tag 16; and/or the like. When the transferee 12 selects an option that includes the process described herein, computer system 20 can prompt the transferee 12 for some or all of the transferee information 42A, if it would not otherwise be provided as a result of the transfer event.

By storing the custom identifier 44 on the identification tag 16 associated with the item 14, computer system 20 can later retrieve information associated with the item 14 and/or the transferee 12 by acquiring the custom identifier 44 from the identification tag 16. For example, a return event occurs when an individual brings the item 14 back to a place of business for exchange, servicing, return, and/or the like. In this case, computer system 20 can utilize the custom identifier 44 to verify authorization of the individual to perform a transaction, access information on the item 14, access information on the individual, access information on a previous transfer event, and/or the like.

Figure 3A:
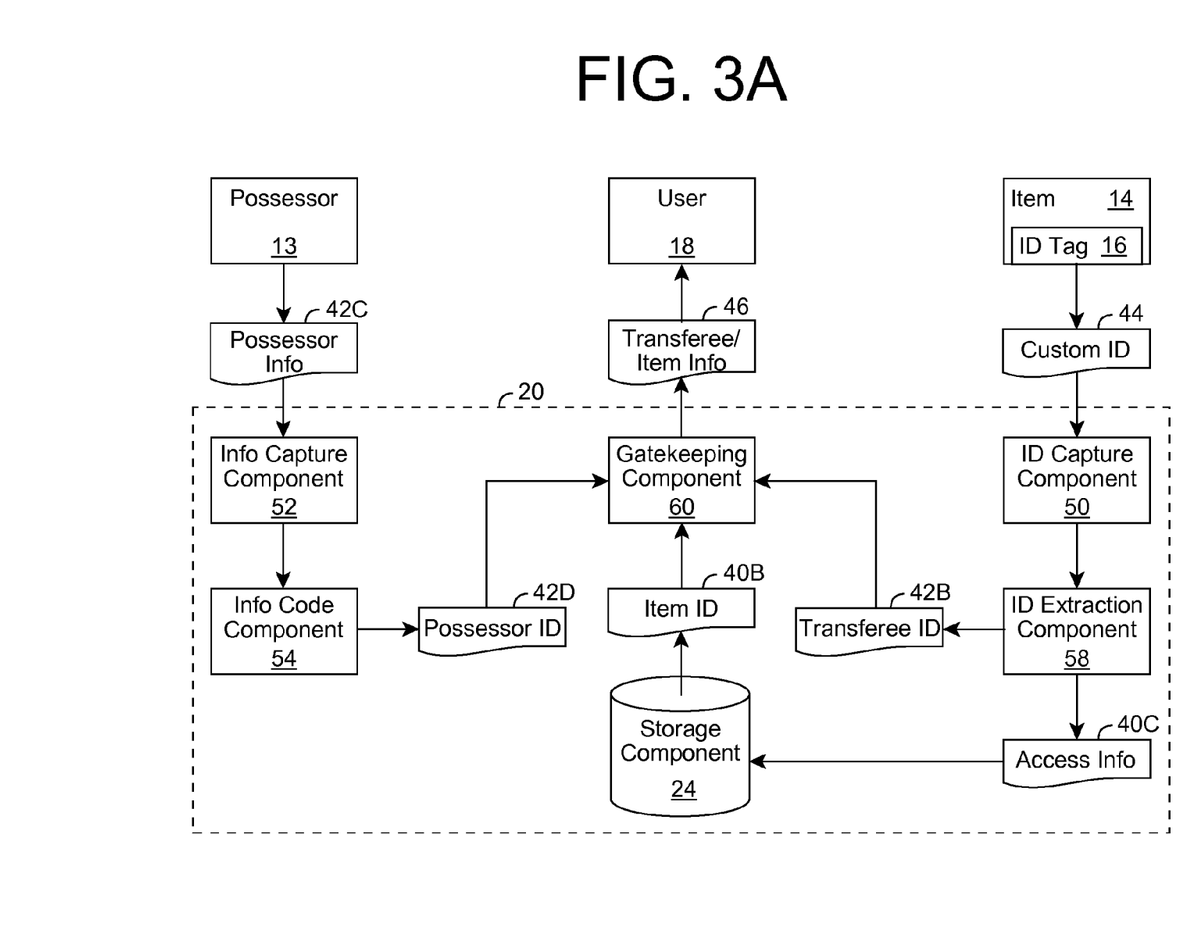
FIGS. 3A and 3B show illustrative data flow and process flow diagrams, respectively, for a return event according to an embodiment.
Figure 3B:
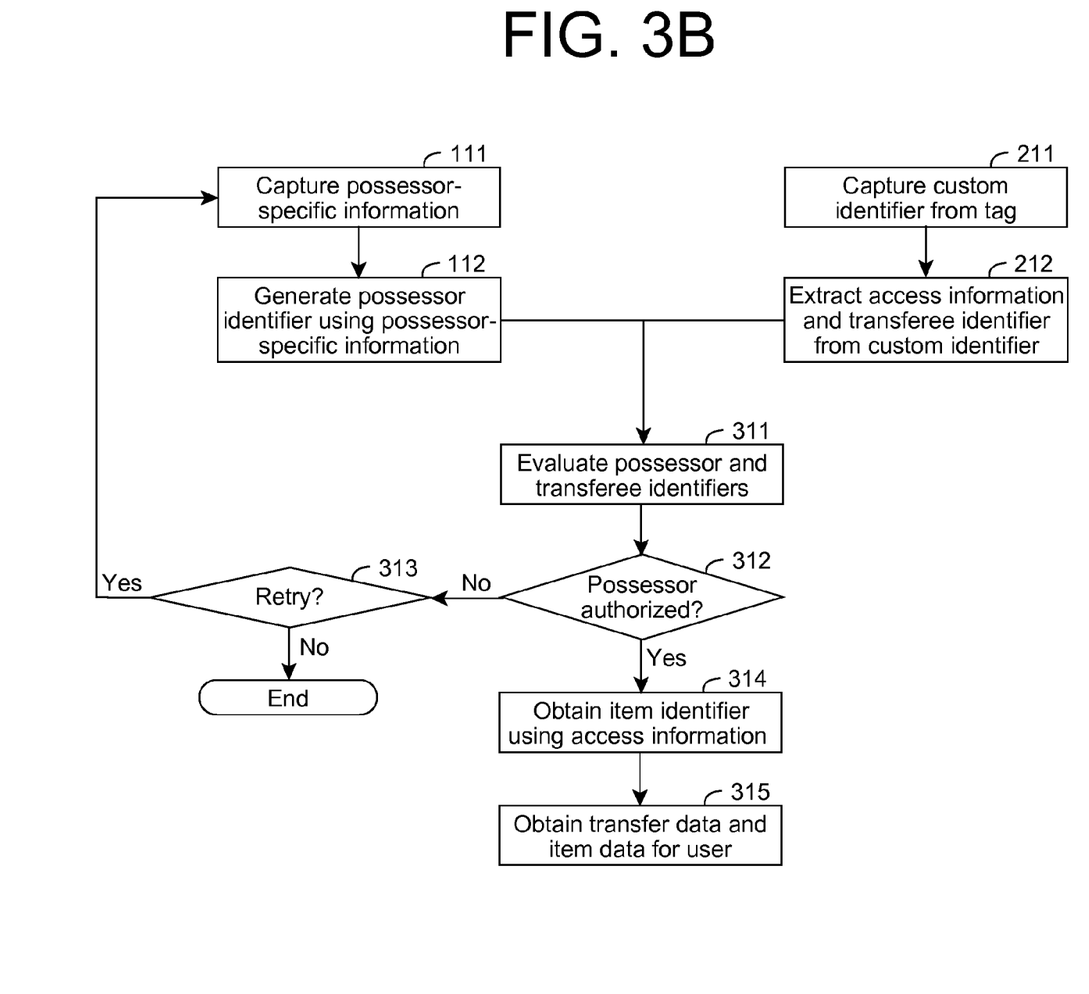

FIGS. 3A and 3B show illustrative data flow and process flow diagrams, respectively, for a return event, which can be managed by computer system 20, according to an embodiment. For example, an individual possessing the item 14, i.e., possessor 13, can arrive at a store with the item 14. A user 18 (e.g., an employee of the store) can assist the possessor 13 in processing the return event using the computer system 20. In order to process the return event, the user 18 may require access to item data 40 and/or transfer data 42 stored on storage component 24. Computer system 20 can use the custom identifier 44 to enable access to the item data 40 and/or transfer data 42.

For example, computer system 20 can use the transfer event identification information (e.g., the transferee identifier 42B) to enable access to some or all of the transfer data 42 (e.g., data corresponding to the transferee 12 (FIG. 2A)). To this extent, in process 111, computer system 20 (e.g., an information capture component 52 implemented as part of computer system 20) can capture possessor-specific information 42C using any solution. It is understood that computer system 20 can utilize a comparable solution for acquiring possessor information 42C as shown and described herein with respect to process 101 and the transferee information 42A.

In process 112, computer system 20 (e.g., an information code component 54 implemented as part of computer system 20) can generate return event identification information for the possessor 13 using some or all of the possessor information 42C. It is understood that computer system 20 can utilize a comparable solution for generating the return event identification information as shown and described herein with respect to process 102 and the transfer event identification information.

Additionally, computer system 20 can use the custom identifier 44 to enable access to some or all of the item data 40 and/or transfer data 42. To this extent, in process 211, computer system 20 (e.g., an identifier capture component 50 implemented as part of computer system 20) can capture item information, which includes the custom identifier 44 using any solution. It is understood that computer system 20 can utilize a comparable solution for capturing the custom identifier 44 as shown and described herein with respect to process 201 and the item identifier 40B.

In process 212, computer system 20 (e.g., an identifier extraction component 58 implemented as part of computer system 20) can extract the at least a portion of the access information 40C and the at least a portion of the transferee identifier 42B from the custom identifier 44 associated with the item 14 using any solution. In particular, computer system 20 can perform a complementary process as that shown and described with respect to process 302 and generation of the custom identifier 44. For example, computer system 20 can identify and extract the data included in the portions of the custom identifier 44 (e.g., sets of bits) that respectively correspond to the access information 40C and transferee identifier 42B.

Computer system 20 can use the access information 40C, transferee identifier 42B, and possessor identifier 42D to manage access to additional information on the item 14, the previous transfer event, and/or the like. For example, in process 311, computer system 20 (e.g., a gatekeeping component 60 implemented as part of computer system 20) can evaluate the possessor identifier 42D and the transferee identifier 42B and in process 312, determine whether the possessor 13 of the item 14 is authorized to proceed with conducting a return event for the item 14 based on the evaluation. For example, computer system 20 can compare the identifiers 42B, 42D to determine whether the possessor 13 is the same individual as the transferee 12 (FIG. 2A) using any solution. In particular, computer system 20 can determine whether the identifiers 42B, 42D are identical, within a predetermined threshold of one another, and/or the like. Additionally, computer system 20 can present the transferee information 42A and possessor information 42C used to generate the identifiers 42B, 42D, respectively, to user 18, who can visually inspect the transferee information 42A and possessor information 42C, e.g., when an automated comparison by computer system 20 is inconclusive.

Computer system 20 (e.g., gatekeeping component 60) also can evaluate the identifiers 42B, 42D to determine whether the transferee 12 and the possessor 13 belong to a related group of individuals, any one of which can possess the item 14 and conduct transactions with respect to the item 14. For example, computer system 20 can obtain stored information corresponding to transferee 12 and the possessor 13 using the respective identifiers 42B, 42D, and determine whether the two individuals 12, 13 belong to the same group. The stored information can indicate that the two individuals 12, 13 are in the same family (e.g., husband and wife), work for the same business entity, and/or the like. In this case, when the transferee 12 and the possessor 13 are determined to belong to the same group of individuals, in process 312, computer system 20 can authorize the possessor 13 to proceed with the return event.

When the possessor 13 is not authorized in process 312, computer system 20 can determine whether to attempt to authorize the possessor 13 again in process 313. If so, computer system 20 can prompt the possessor 13 to resubmit the possessor information 42C and regenerate the possessor identifier 42D, request alternative identification information from the possessor 13, and/or the like. If not, the authorization can terminate and the return transaction cannot be completed.

When the possessor 13 is authorized, in process 314, computer system 20 (e.g., gatekeeping component 60) can obtain the item identifier 40B from storage component 24 using the access information 40C. Furthermore, in process 315, computer system 20 can obtain any additional item data 40 (FIG. 1), which can be accessed using access information 40C, the item identifier 40B, and/or the like, as well as transfer data 42 (FIG. 1), which can be accessed using the item identifier 40B, the transferee identifier 42B, and/or the like. Computer system 20 can provide the item data 40 and/or transfer data 42 for presentation to the user 18, while the user 18 and possessor 13 perform the return event processing for the item 14 using the computer system 20. To this extent, computer system 20 can acquire/present information regarding the return event from/to possessor 13 and/or user 18, and store information regarding the return event in storage component 24 and/or on identification tag 16 using the process described herein. For example, computer system 20 can provide the original item identifier 40B (e.g., the original EPC of the item 14) for storage on the identification tag 16 as part of the return event processing.

While shown and described herein as a method and system for managing information using an identification tag, it is understood that aspects of the invention further provide various alternative embodiments. For example, in one embodiment, the invention provides a computer program fixed in at least one computer-readable medium, which when executed, enables a computer system to manage information using an identification tag. To this extent, the computer-readable medium includes program code, such as information management program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of configuring a computer system to implement a process for managing information using an identification tag. In this case, the method can include providing a copy of program code, such as information management program 30 (FIG. 1), which implements some or all of a process described herein, for use on a computer system. A source computer system can process a copy of program code that implements some or all of a process described herein to generate and transmit, for reception at a second, distinct computer system, a set of data signals that has one or more of its characteristics set and/or changed in such a manner as to encode a copy of the program code in the set of data signals. The destination computer system acquires a copy of the program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, a method of generating a system for managing information using an identification tag is provided. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing information using an identification tag, the method comprising:
  managing a first event for an item using a computer system, wherein the identification tag is associated with the item, and
  wherein the first event transfers possession of the item to a transferee, the managing including:
  obtaining an item identifier stored on the identification tag, wherein the item identifier corresponds to an identification of the item;
  storing the item identifier in a data store, wherein the item identifier can be retrieved from the data store using access information uniquely identifying a storage location for the item identifier in the data store;
  obtaining predetermined first event identification information for the transferee, wherein the predetermined first event identification information uniquely identifies the transferee;
  subsequent to the obtaining of the item identifier and the obtaining of the predetermined first event identification information, generating a custom identifier based on a combination of at least a portion of the predetermined first event identification information for the transferee of the item and at least a portion of the access information for the item identifier; and providing the custom identifier for storage on the identification tag in place of the item identifier.

2. The method of claim 1, wherein the identification tag comprises a radio frequency identification (RFID) tag attached to the item and wherein the item identifier comprises an electronic product code (EPC) for the item.

3. The method of claim 1, wherein the predetermined first event identification information for the transferee is obtained using an electronic signature capture device.

4. The method of claim 1, wherein the generating includes setting a first set of bits of the custom identifier according to the at least a portion of the predetermined first event identification information for the transferee and setting a second set of bits of the custom identifier according to the at least a portion of the access information for the identifier.

5. The method of claim 1, wherein the obtaining of the predetermined first event identification information for the transferee includes:
   acquiring two-dimensional data corresponding to the transferee;
   extracting a set of integers from the two-dimensional data, wherein the set of integers correspond to a set of unique features present in the two-dimensional data; and
   generating a transferee identifier corresponding to the transferee based on the extracted set of integers.

6. The method of claim 1, further comprising managing a second event for the item using the computer system, the second event occurring after the first event, the managing of the second event including:
   obtaining the custom identifier stored on the identification tag;
   extracting the predetermined first event identification information for the transferee from the custom identifier;
   obtaining second event identification information for a possessor of the item;
   determining whether the possessor corresponds to the transferee using the predetermined first event identification information and the second event identification information; and
   enabling access to personal data for the transferee stored in the computer system in response to determining the possessor corresponds to the transferee.

7. The method of claim 6, further comprising:
   extracting the access information for the item identifier from the custom identifier; and
   retrieving the item identifier from the data store using the access information.

8. A computer system comprising:
a set of computing devices for managing information using an identification tag by performing a method comprising:
   managing a first event for an item, wherein the identification tag is associated with the item, and wherein the first event transfers possession of the item to a transferee, the managing including:
      obtaining an item identifier stored on the identification tag, wherein the item identifier corresponds to an identification of the item;
      storing the item identifier in a data store, wherein the item identifier can be retrieved from the data store using access information uniquely identifying a storage location for the item identifier in the data store;
      obtaining predetermined first event identification information for the transferee, wherein the predetermined first event identification information uniquely identifies the transferee;
      subsequent to the obtaining of the item identifier and the obtaining of the predetermined first event identification information, generating a custom identifier based on a combination of at least a portion of the predetermined first event identification information for the transferee of the item and at least a portion of the access information for the item identifier; and
      providing the custom identifier for storage on the identification tag in place of the item identifier.

9. The system of claim 8, wherein the identification tag comprises a radio frequency identification (RFID) tag attached to the item and wherein the item identifier comprises an electronic product code (EPC) for the item.

10. The system of claim 8, wherein the predetermined first event identification information for the transferee is obtained using an electronic signature capture device.

11. The system of claim 8, wherein the generating includes setting a first set of bits of the custom identifier according to the at least a portion of the predetermined first event identification information for the transferee and setting a second set of bits of the custom identifier according to the at least a portion of the access information for the identifier.

12. The system of claim 8, wherein the obtaining of the predetermined first event identification information for the transferee includes:
   acquiring two-dimensional data corresponding to the transferee;
   extracting a set of integers from the two-dimensional data, wherein the set of integers correspond to a set of unique features present in the two-dimensional data; and
   generating a transferee identifier corresponding to the transferee based on the extracted set of integers.

13. The system of claim 8, the method further comprising managing a second event for the item, the second event occurring after the first event, the managing the second event including:
   obtaining the custom identifier stored on the identification tag;
   extracting the predetermined first event identification information for the transferee from the custom identifier;
   obtaining second event identification information for a possessor of the item;
   determining whether the possessor corresponds to the transferee using the predetermined first event identification information and the second event identification information; and
   enabling access to personal data for the transferee stored in the computer system in response to determining the possessor corresponds to the transferee.

14. The system of claim 13, the method further comprising:
   extracting the access information for the item identifier from the custom identifier; and
   retrieving the item identifier from the data store using the access information.

15. A computer program comprising program code embodied in at least one computer-readable storage medium, which when executed, enables a computer system to implement a method of managing information using an identification tag, the method comprising:
   managing a first event for an item, wherein the identification tag is associated with the item, and wherein the first event transfers possession of the item to a transferee, the managing including:
      obtaining an item identifier stored on the identification tag, wherein the item identifier corresponds to an identification of the item;

storing the item identifier in a data store, wherein the item identifier can be retrieved from the data store using access information uniquely identifying a storage location for the item identifier in the data store;

obtaining predetermined first event identification information for the transferee, wherein the predetermined first event identification information uniquely identifies the transferee;

subsequent to the obtaining of the item identifier and the obtaining of the predetermined first event identification information, generating a custom identifier based on a combination of at least a portion of the predetermined first event identification information for the transferee of the item and at least a portion of the access information for the item identifier; and providing the custom identifier for storage on the identification tag in place of the item identifier.

16. The computer program of claim 15, wherein the generating includes setting a first set of bits of the custom identifier according to the at least a portion of the predetermined first event identification information for the transferee and setting a second set of bits of the custom identifier according to the at least a portion of the access information for the identifier.

17. The computer program of claim 15, wherein the obtaining of the predetermined first event identification information for the transferee includes:

acquiring two-dimensional data corresponding to the transferee;

extracting a set of integers from the two-dimensional data, wherein the set of integers correspond to a set of unique features present in the two-dimensional data; and generating a transferee identifier corresponding to the transferee based on the extracted set of integers.

18. The computer program of claim 15, the method further comprising managing a second event for the item, the second event occurring after the first event, the managing the second event including:

obtaining the custom identifier stored on the identification tag;

extracting the predetermined first event identification information for the transferee from the custom identifier;

obtaining second event identification information for a possessor of the item;

determining whether the possessor corresponds to the transferee using the predetermined first event identification information and the second event identification information; and enabling access to personal data for the transferee stored in the computer system in response to determining the possessor corresponds to the transferee.

19. The computer program of claim 18, the method further comprising:

extracting the access information for the item identifier from the custom identifier; and retrieving the item identifier from the data store using the access information.

20. A method of generating a computer system for managing information using an identification tag, the method comprising:

providing a computer system operable to:

manage a first event for an item, wherein the identification tag is associated with the item and wherein the first event transfers possession of the item to a transferee, the managing including:

obtaining an item identifier stored on the identification tag, wherein the item identifier corresponds to an identification of the item;

storing the item identifier in a data store, wherein the item identifier can be retrieved from the data store using access information uniquely identifying a storage location for the item identifier in the data store;

obtaining predetermined first event identification information for the transferee, wherein the predetermined first event identification information uniquely identifies the transferee;

subsequent to the obtaining of the item identifier and the obtaining of the predetermined first event identification information, generating a custom identifier based on a combination of at least a portion of the predetermined first event identification information for the transferee of the item and at least a portion of the access information for the item identifier; and providing the custom identifier for storage on the identification tag in place of the item identifier.

\* \* \* \* \*